United States Patent
Wittwer et al.

(10) Patent No.: US 7,505,435 B2
(45) Date of Patent: Mar. 17, 2009

(54) RF CIRCUITRY AND COMPACT HYBRID FOR WIRELESS COMMUNICATION DEVICES

(75) Inventors: David C Wittwer, San Diego, CA (US); Mark L Blake, Lakeside, CA (US)

(73) Assignee: Intel Corporation, Santa Clara, CA (US)

( * ) Notice: Subject to any disclaimer, the term of this patent is extended or adjusted under 35 U.S.C. 154(b) by 1169 days.

(21) Appl. No.: 10/726,053

(22) Filed: Dec. 2, 2003

(65) Prior Publication Data

US 2005/0117545 A1 Jun. 2, 2005

(51) Int. Cl.
*H04Q 7/00* (2006.01)
(52) U.S. Cl. ...................... 370/332; 343/725
(58) Field of Classification Search ............... 370/332, 370/334, 912, 913; 455/269, 272, 273, 274, 455/275, 276.1; 343/702, 725, 729, 844, 343/893

See application file for complete search history.

(56) References Cited

U.S. PATENT DOCUMENTS

| | | | | |
|---|---|---|---|---|
| 3,568,197 A * | 3/1971 | Cubley | ......................... | 455/77 |
| 4,220,954 A * | 9/1980 | Marchand | .................... | 342/433 |
| 5,493,720 A * | 2/1996 | Peterson | ..................... | 455/313 |
| 6,741,293 B1* | 5/2004 | Obuchi | ....................... | 348/554 |
| 6,894,657 B2* | 5/2005 | Carey | ......................... | 343/853 |
| 7,295,254 B2* | 11/2007 | Bendov | ..................... | 348/836 |

* cited by examiner

*Primary Examiner*—Quochien B Vuong
(74) *Attorney, Agent, or Firm*—Schwegman, Lundberg & Woessner, P.A.; Gregory J. Gorrie (57) ABSTRACT

A compact hybrid comprises reactive power-dividers and signal paths coupling the reactive power-dividers to provide a predetermined phase difference therebetween. The signal paths may have 90-degree bends therein to reduce a distance between adjacent reactive power-dividers to less than a physical distance associated with the predetermined phase difference in a stripline medium. The hybrid may be a 180-degree hybrid and may be part of RF circuitry of a wireless communication device to combine signals from a pair of antennas and to provide a sum signal and a difference signal. The RF circuitry may also comprise switching circuitry to select between the sum signal and the difference signal based on a signal quality of the sum and difference signals.

24 Claims, 5 Drawing Sheets

RF CIRCUITRY AND COMPACT HYBRID FOR WIRELESS COMMUNICATION DEVICES

TECHNICAL FIELD

Some embodiments of the present invention pertain to wireless communications. Some embodiments pertain to microwave circuitry, and some embodiments pertain to wireless local area networks (WLANs).

BACKGROUND

Conventional hybrids are used in many radio-frequency (RF) circuit applications including applications to combine and separate signals such as antenna signals. One problem with conventional hybrids is that they are relatively large because predetermined phase-differences are provided between certain ports. Many wireless communication devices, especially those operating in wireless local area networks (WLANs), are hindered by reception and/or transmission problems due to nulls in their antenna patterns. Wireless communication devices could benefit from the use of hybrids to improve their signal reception and/or transmission; however, conventional hybrids are generally too large for use in many portable and hand-held devices. Thus, there are general needs for smaller, more compact hybrids, especially hybrids for use in wireless communication devices where size and weight are important.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the inventive subject matter may be referred to, individually or collectively, herein by the term "invention" merely for convenience and without intending to voluntarily limit the scope of this application to any single invention or inventive concept if more than one is in fact disclosed.

Figure 1:
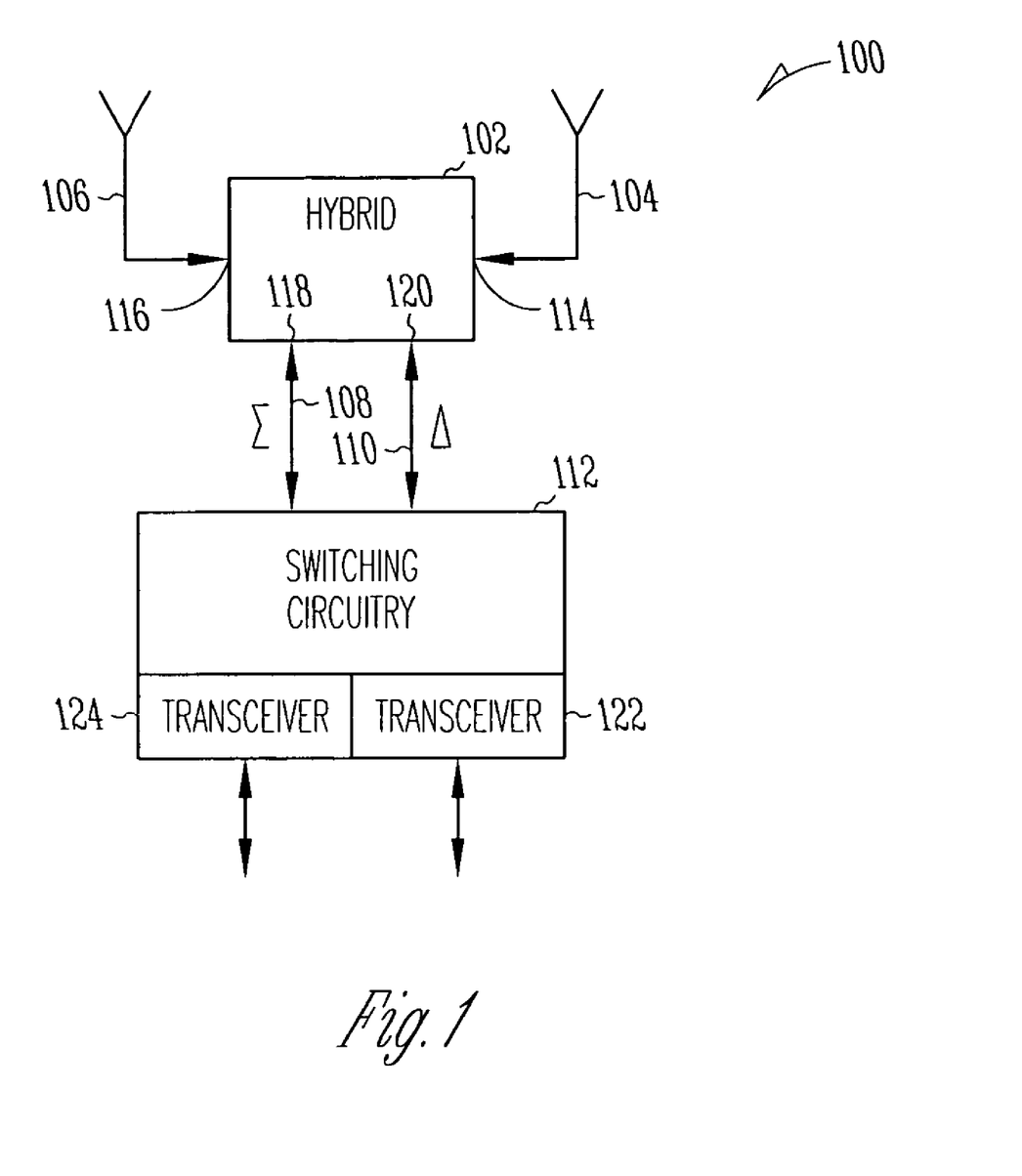
FIG. 1 illustrates RF circuitry in accordance with some embodiments of the present invention.

FIG. 1 illustrates RF circuitry in accordance with some embodiments of the present invention. RF circuitry 100 comprises compact hybrid 102 to combine signals from a pair of antennas 104 and 106 and to provide sum signal 108 and difference signal 110. RF circuitry 100 may also comprise switching circuitry 112 to select between sum signal 108 and difference signal 110 based on a signal quality of sum signal 108 and difference signal 110. In some embodiments, hybrid 102 comprises antenna port 114 to couple with antenna 104, antenna port 116 to couple with antenna 106, switch port 118 to provide sum signal 108 and switch port 120 to provide difference signal 110.

In some embodiments, a signal path between at least some of the ports of hybrid 102 is a compressed signal path having one or more 90-degree bends to allow substantially closer spacing between at least some of the ports. In some embodiments, the signal paths may comprise transmission line segments that are folded. In some embodiments, hybrid 102 comprises reactive power-dividers associated with the ports, and hybrid 102 provides substantially a predetermined (e.g., approximately ¼ or ¾ wavelength) phase difference between certain ports with a compressed structure. In these embodiments, the reactive power-dividers may be spaced closer than a physical distance associated with the predetermined phase difference in a stripline medium. In these embodiments, a signal path between at least some of the reactive power-dividers includes 90-degree bends to reduce the physical distance between the reactive power-dividers to less than the physical distance associated with the predetermined phase difference. Examples of this are described below and illustrated in subsequent figures. The compressed structure may include a compressed stripline structure or a compressed microstrip structure, as well as compressed structures fabricated with almost any printed circuit technology.

In some embodiments, instead of 90-degree bends in the signal paths, hybrid 102 may include curved signal paths to reduce the distance between the reactive power-dividers. In some embodiments, sum signal 108 may comprise signals from both antennas 104 and 106 combined substantially in-phase, and difference signal 110 may comprise signals from both antennas 104 and 106 combined substantially out-of-phase. Switching circuitry 112 may comprise logic circuitry to compare a signal quality, such as a packet error rate, between sum signal 108 and difference signal 110 and may select the signal having the better signal quality, although the scope of the inventive subject matter is not limited in this respect.

In some embodiments, RF circuitry 100 may comprise transceiver circuitry 122 and/or 124 to measure the packet error rate of sum signal 108 and difference signal 110 for switching circuitry 112. In these embodiments, transceiver circuitry 122 and/or 124 may receive the selected signal from switching circuitry 112 for subsequent demodulation and/or processing.

In some embodiments, hybrid 102 provides substantially a ¾ wavelength phase difference between antenna port 114 and switch port 120, provides substantially a ¼ wavelength phase difference between antenna port 114 and switch port 118, provides substantially a ¼ wavelength phase difference between antenna port 116 and switch port 118, and provides substantially a ¼ wavelength phase difference between antenna port 116 and the switch port 120, although the scope of the inventive subject matter is not limited in this respect.

In some embodiments, RF circuitry 100 may be part of a wireless communication device. The communication device may receive and/or transmit RF communications with antennas 104 and 106. The RF signals may be down-converted to baseband signals by transceiver circuitry 122 and/or 124 and may be up-converted by transceiver circuitry 122 and/or 124 for transmission by antennas 104 and 106. The baseband signals may be converted to data signals for subsequent use within the communication device. The wireless communication device may be, for example, a personal digital assistant (PDA), a laptop or portable computer with wireless communication capability, a web tablet, a wireless telephone, a wireless headset, a pager, an instant messaging device, an MP3 player, a digital camera, an access point or other device that may receive and/or transmit information wirelessly.

In some embodiments, circuitry 100 may transmit and/or receive RF communications in accordance with specific communication standards, such as the IEEE 802.11(a), 802.11(b), 802.11(g/h) and/or 802.16 standards for wireless local area network communications, although circuitry 100 may also be suitable to transmit and/or receive communications in accordance with other techniques including the Digital Video Broadcasting Terrestrial (DVB-T) broadcasting standard, and the High performance radio Local Area Network (HiperLAN) standard. In some embodiments, the RF signals may comprise orthogonal frequency-division multiplexed (e.g., OFDM) signals comprising a plurality of symbol-modulated subcarriers in either a 5 GHz frequency spectrum or 2.4 GHz frequency spectrum. In some embodiments, the RF signals may comprise direct-sequence spread-spectrum modulated signals in a 2.4 GHz spectrum. In some embodiments, the RF signals may comprise one of either orthogonal frequency-division multiplexed signals comprising a plurality of symbol-modulated subcarriers or complementary code-keying modulated signals. In these embodiments, the signals may be in a 2.4 GHz frequency spectrum. In some embodiments, the orthogonal subcarriers of a subchannel may be closely spaced OFDM subcarriers. To achieve orthogonality between closely spaced subcarriers, in some embodiments the subcarriers of a particular subchannel may have null at substantially a center frequency of the other subcarriers of that subchannel.

In some embodiments, circuitry 100 may comprise one or more transceivers. In these embodiments, transceiver circuitry 122 may process signals in one frequency spectrum (e.g., a 5 GHz frequency spectrum), and transceiver circuitry 124 may process signals in another frequency spectrum (e.g., a 2.4 GHz frequency spectrum). In these embodiments, the particular frequency spectrum may be selected by a user of the wireless communication device, and either transceiver 122 or transceiver 124 may operate, although the scope of the inventive subject matter is not limited in this respect. In some embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the inventive subject matter is not limited in this respect, as other frequency spectrums may also be equally suitable.

Antennas 104 and 106 may comprise directional or omnidirectional antennas, including, for example, dipole antennas, monopole antennas, loop antennas, microstrip antennas or other types of antennas suitable for reception and/or transmission of RF signals. In some embodiments, antennas 104 and 106 may be positioned to help assure substantially in-phase reception and/or transmission of RF signals in a predetermined frequency spectrum, although the scope of the inventive subject matter is not limited in this respect. In some embodiments, the operation of hybrid 102 for generating sum and difference patterns is independent of the spacing between antennas 104 and 106.

In some embodiments, sum signal 108 may represent a sum antenna pattern of antennas 104 and 106, and difference signal 110 may represent a difference antenna pattern of antennas 104 and 106. The use of the sum and difference antenna patterns allows the null values of one pattern to correspond to the maximum values of the other pattern. In this way, the input to transceiver 122 and/or 124 may be selected to be within 3 dB of its maximum value. The use of the sum and difference antenna patterns may also help reduce the possibility that both antennas are receiving nulls.

Although many embodiments of the present invention are described for the reception of RF signals, embodiments of the present invention are equally suitable for the transmission of RF signals. For example, circuitry 100 may transmit either sum signal 108 or difference signal 110 selected by switching circuitry 112. Sum signal 108 may be separated into two substantially in-phase components by hybrid 102 for transmission by antennas 104 and 106, and difference signal 110 may be separated into two substantially out-of-phase components by hybrid 102 for transmission by antennas 104 and 106.

Figure 2:
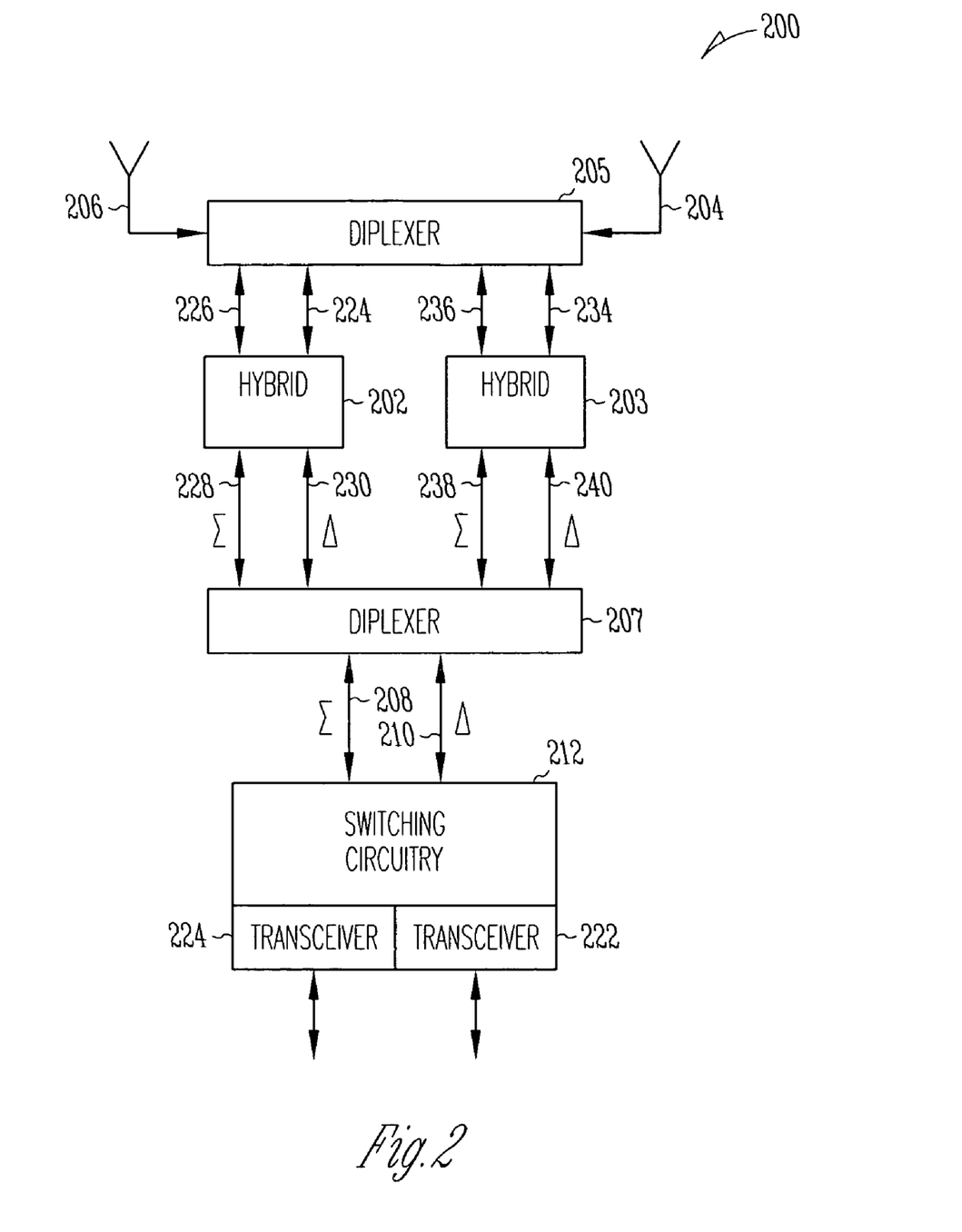
FIG. 2 illustrates RF circuitry in accordance with some other embodiments of the present invention.

FIG. 2 illustrates RF circuitry in accordance with some other embodiments of the present invention. In addition to the functionality provided by RF circuitry 100 (FIG. 1), RF circuitry 200 may operate in more than one frequency spectrum. In these embodiments, RF circuitry 200 further comprises compact hybrid 203 and diplexing circuitry 205 and 207. Hybrid 202 may operate in a first frequency spectrum (e.g., a 2.4 GHz frequency spectrum) while hybrid 203 may operate in a second frequency spectrum (e.g., a 5 GHz frequency spectrum) although the scope of the inventive subject matter is not limited in this respect. Diplexing circuitry 205 may separate signals based on their frequency and provide, for example, signals in the first frequency spectrum to hybrid 202 and signals in the second frequency spectrum to hybrid 203.

Hybrid 202 may receive signals 224 in the first frequency spectrum from antenna 204 and may receive signals 226 in the first frequency spectrum from antenna 206. Hybrid 202 may combine signals 224 and 226 substantially in-phase to generate sum signal 228 in the first frequency spectrum, and it may combine signals 224 and 226 substantially out-of-phase to generate difference signal 230 in the first frequency spectrum.

Hybrid 203 may receive signals 234 in the second frequency spectrum from antenna 204 and may receive signals 236 in the second frequency spectrum from antenna 206. Hybrid 203 may combine signals 234 and 236 substantially in-phase to generate sum signal 238 in the second frequency spectrum, and it may combine signals 234 and 236 substantially out-of-phase to generate difference signal 240 in the second frequency spectrum.

Diplexing circuitry 207 may combine sum signals 228 and 238 to generate combined sum signal 208, and it may combine difference signals 230 and 240 to generate combined difference signal 210. Combined sum signal 208 and combined difference signal 210 may correspond to sum signal 108 (FIG. 1) and difference signal 110 (FIG. 1), respectively.

In some embodiments, either the first or the second frequency spectrum may be selected, and switching circuitry 212 may select between the sum and difference signals of the selected frequency spectrum based on the packet error rate of the signals. In some embodiments, the particular frequency spectrum may be user-selectable. In these embodiments, transceiver 222 may process signals of the first frequency spectrum, and transceiver 224 may process signals of the second frequency spectrum.

The inclusion of hybrids 202 and 203 and diplexer 205 in RF circuitry 200 may allow a single pair of antennas to be used in a sum and difference configuration. Circuitry 200 also may provide for the selective reception and/or transmission of signals in more than one frequency spectrum with the use of a single switching element, such as switching circuitry 212.

Diplexing circuitry 205 and 207 are illustrated as separate elements for ease in understanding some embodiments of this present invention. In some embodiments, diplexing circuitry 205 and 207 may be fabricated on a single circuit board. In some embodiments, diplexing circuitry 205 and 207 and hybrids 202 and 203 may be fabricated on the same circuit board, although the scope of the inventive subject matter is not limited in this respect.

Figure 3:
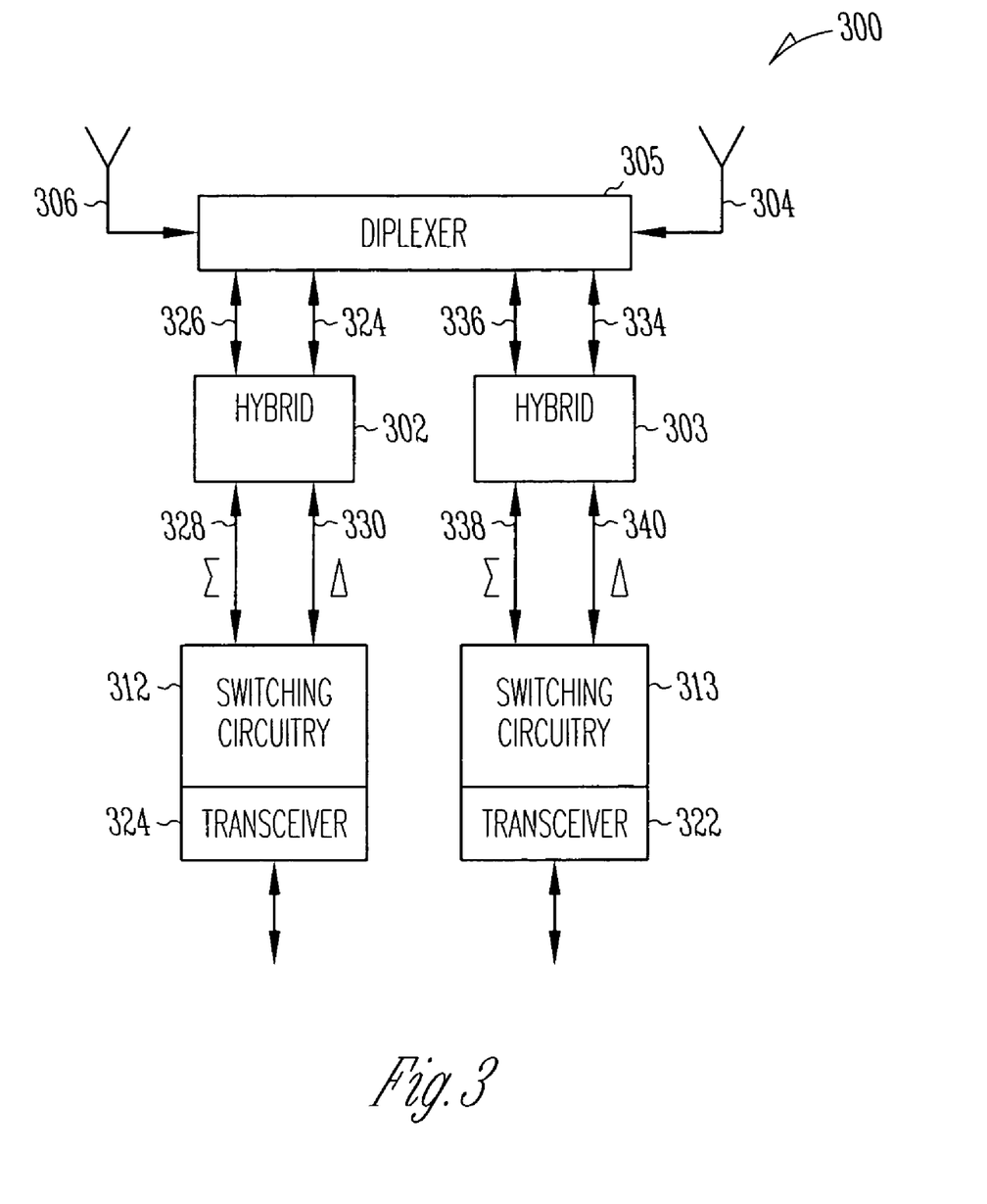
FIG. 3 illustrates RF circuitry in accordance with some other embodiments of the present invention.

FIG. 3 illustrates RF circuitry in accordance with some other embodiments of the present invention. In addition to the functionality provided by RF circuitry 100 (FIG. 1), RF circuitry 300 may operate in more than one frequency spectrum. In these embodiments, RF circuitry 300 further comprises compact hybrid 303 and diplexing circuitry 305. Hybrid 302 may operate in a first frequency spectrum (e.g., a 2.4 GHz frequency spectrum) while hybrid 303 may operate in a second frequency spectrum (e.g., a 5 GHz frequency spectrum) although the scope of the inventive subject matter is not limited in this respect. Diplexing circuitry 305 may separate signals based on their frequency and provide, for example, signals in the first frequency spectrum to hybrid 302 and signals in the second frequency spectrum to hybrid 303.

Hybrid 302 may receive signals 324 in the first frequency spectrum from antenna 304 and may receive signals 326 in the first frequency spectrum from antenna 306. Hybrid 302 may combine signals 324 and 326 substantially in-phase to generate sum signal 328 in the first frequency spectrum, and it may combine signals 324 and 326 substantially out-of-phase to generate difference signal 330 in the first frequency spectrum.

Hybrid 303 may receive signals 334 in the second frequency spectrum from antenna 304 and may receive signals 336 in the second frequency spectrum from antenna 306. Hybrid 303 may combine signals 334 and 336 substantially in-phase to generate sum signal 338 in the second frequency spectrum, and it may combine signals 334 and 336 substantially out-of-phase to generate difference signal 340 in the second frequency spectrum.

Sum signal 328 and difference signal 330 of the first frequency spectrum may be provided to switching circuitry 312, and sum signal 338 and difference signal 340 of the second frequency spectrum may be provided to switching circuitry 313.

In some embodiments, either the first or the second frequency spectrum may be selected for use by the wireless communication device, and switching circuitry 312 or 313 may select between the sum and difference signals of the selected frequency spectrum based on a signal quality of the signals. In some embodiments, the particular frequency spectrum may be user-selectable. In these embodiments, transceiver 324 may process signals of the first frequency spectrum, and transceiver 322 may process the signals of the second frequency spectrum.

The inclusion of hybrids 302 and 303 and diplexer 305 in RF circuitry 300 may allow a single pair of antennas to be used in a sum and difference configuration. Circuitry 300 also may provide for the selective reception and/or transmission of signals in more than one frequency spectrum. In some embodiments, hybrids 302 and 303 and diplexer 305 may also provide isolation for a Blue-Tooth antenna, which may be included with the antennas.

Figure 4:
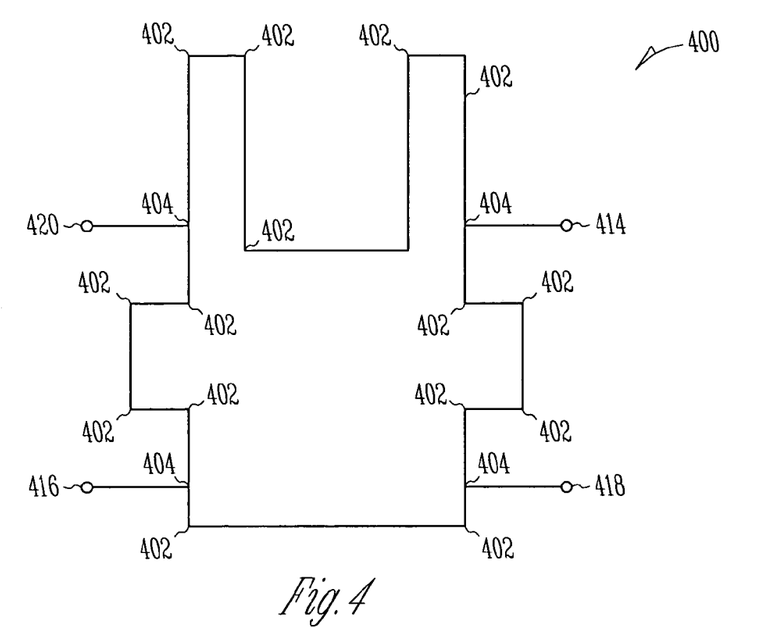
FIG. 4 illustrates a layout of a hybrid in accordance with some embodiments of the present invention.

FIG. 4 illustrates a layout of a hybrid in accordance with some embodiments of the present invention. Compact hybrid 400 may be suitable for use as hybrid 102 (FIG. 1), although other layouts may also be suitable. Hybrid 400 may also be suitable for hybrid 202 (FIG. 2) and/or hybrid 203 (FIG. 2) depending on the frequency spectrum. Hybrid 400 may also be suitable for hybrid 302 (FIG. 3) and/or 303 (FIG. 3) depending on the frequency spectrum.

In some embodiments, hybrid 400 may have antenna port 414 to couple with a first of a pair of antennas, antenna port 416 to couple with a second of the antennas, switch port 418 to provide a sum signal, and switch port 420 to provide a difference signal. The signal path between at least some of the ports may be a compressed signal path having 90-degree bends 402 to allow substantially closer spacing between at least some of the ports. In some embodiments, a sum signal at port 418 comprises signals from antenna ports 414 and 416 combined substantially in-phase, and a difference signal at port 420 comprises signals from antenna ports 414 and 416 combined substantially out-of-phase.

Hybrid 400 also comprises reactive power-dividers 404 associated with the ports. Reactive power-dividers 404 are illustrated as T-junctions, although the scope of the inventive subject matter is not limited in this respect. The signal path between reactive power-dividers 404 comprises one or more 90-degree bends 402 to reduce the physical distance between the reactive power-dividers to less than the physical distance associated with the predetermined phase difference. In some embodiments, 90-degree bends 402 may be reactive elements affecting the length of the signal path between reactive power-dividers 404.

In some embodiments, hybrid 400 comprises a 180-degree compact hybrid. In these embodiments, hybrid 400 provides substantially a ¾ wavelength phase difference between antenna port 414 and switch port 420, provides substantially a ¼ wavelength phase difference between antenna port 414 and switch port 418, provides substantially a ¼ wavelength phase difference between antenna port 416 and switch port 418, and provides substantially a ¼ wavelength phase difference between antenna port 416 and the switch port 420, although the scope of the inventive subject matter is not limited in this respect. In some embodiments, hybrid 400 may operate as a 180-degree hybrid in a 5 GHz frequency spectrum, although the scope of the inventive subject matter is not limited in this respect.

The layout of hybrid 400 illustrated in FIG. 4 is an example of a hybrid in accordance with some embodiments of the present invention, and nothing requires that 90-degree bends 402 be positioned as shown. In other embodiments, 90-degree bends 402 may be positioned in other locations between reactive power-dividers 402.

Figure 5:
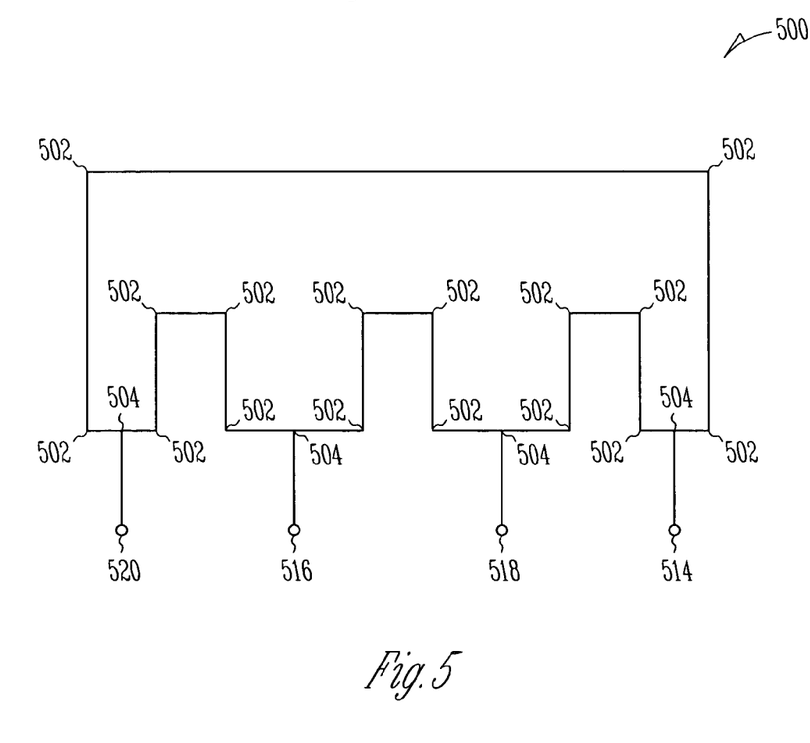
FIG. 5 illustrates a layout of a hybrid in accordance with some other embodiments of the present invention.

FIG. 5 illustrates a layout of a hybrid in accordance with some other embodiments of the present invention. Compact hybrid 500 may be suitable for use as hybrid 102 (FIG. 1), although other layouts may also be suitable. Hybrid 500 may also be suitable for hybrid 202 (FIG. 2) and/or hybrid 203 (FIG. 2) depending on the frequency spectrum. Hybrid 500 may also be suitable for hybrid 302 (FIG. 3) and/or 303 (FIG. 3) depending on the frequency spectrum.

In some embodiments, hybrid 500 may have antenna port 514 to couple with a first of a pair of antennas, antenna port 516 to couple with a second of the antennas, switch port 518 to provide a sum signal, and switch port 520 to provide a difference signal. The signal path between at least some of the ports may be a compressed signal path having 90-degree bends 502 to allow substantially closer spacing between at least some of the ports. In some embodiments, a sum signal at port 518 comprises signals from antenna ports 514 and 516 combined substantially in-phase, and a difference signal at port 520 comprises signals from antenna ports 514 and 516 combined substantially out-of-phase.

Hybrid 500 also comprises reactive power-dividers 504 associated with the ports. Reactive power-dividers 504 are illustrated as T-junctions, although the scope of the inventive subject matter is not limited in this respect. The signal path between reactive power-dividers 504 comprises one or more 90-degree bends 502 to reduce the physical distance between the reactive power-dividers to less than the physical distance associated with the predetermined phase difference. In some embodiments, 90-degree bends 502 may be reactive elements affecting the length of the signal path between reactive power-dividers 504.

In some embodiments, hybrid 500 comprises a 180-degree compact hybrid. In these embodiments, hybrid 500 provides substantially a ¾ wavelength phase difference between antenna port 514 and switch port 520, provides substantially a ¼ wavelength phase difference between antenna port 514 and switch port 518, provides substantially a ¼ wavelength phase difference between antenna port 516 and switch port 518, and provides substantially a ¼ wavelength phase difference between antenna port 516 and the switch port 520, although the scope of the inventive subject matter is not limited in this respect. In some embodiments, hybrid 500 may operate as a 180-degree hybrid in a 2.4 GHz frequency spectrum, although the scope of the inventive subject matter is not limited in this respect.

The layout of hybrid 500 illustrated in FIG. 5 is an example of a hybrid in accordance with some embodiments of the present invention, and nothing requires that 90-degree bends 502 be positioned as shown. In other embodiments, 90-degree bends 502 may be positioned in other locations between reactive power-dividers 502.

In some embodiments, hybrids 400 (FIG. 4) and 500 may be fabricated in a medium comprising FR-4 dielectric with copper signal paths, although the scope of the inventive subject matter is not limited in this respect. In other embodiments, hybrid 400 may be fabricated on other mediums, such as alumina, and may comprise microstrip signal paths. In some embodiments, the hybrids may have a compressed structure that may include a compressed stripline structure or a compressed microstrip structure, as well as compressed structures fabricated with other printed circuit technologies.

Figure 6:
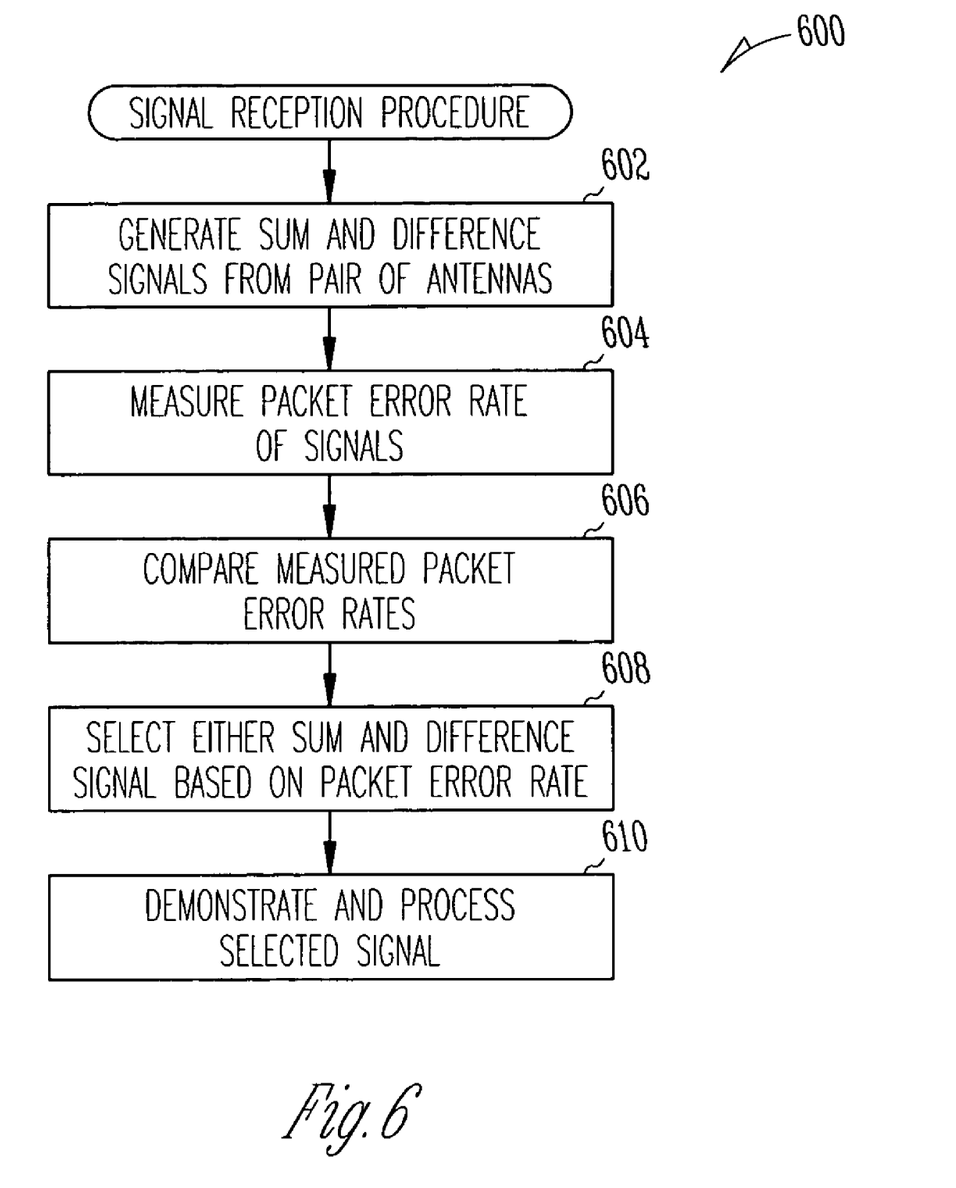
FIG. 6 is a flow chart of a signal-reception procedure in accordance with some embodiments of the present invention.

FIG. 6 is a flow chart of a signal reception procedure in accordance with some embodiments of the present invention. Signal-reception procedure 600 may be performed by RF circuitry, such as RF circuitry 100 (FIG. 1), RF circuitry 200 (FIG. 2) and/or RF circuitry 300 (FIG. 3), although other circuitry may also be used to perform procedure 600.

Operation 602 generates a sum signal and a difference signal. The sum and the difference signals may be generated with a compact hybrid from a pair of antennas, although the scope of the inventive subject matter is not limited in this respect.

Operation 604 measures a signal quality, such as a packet error rate, of the sum of the sum signal and the difference signal, and operation 606 compares the signal quality measurement of the signals. Operation 604 may be performed by transceiver circuitry, and operation 606 may be performed by logic circuitry.

Operation 608 selects between the sum signal and the difference signal based on the measured signal quality of the signals. In some embodiments, the signal having a lower packet error rate may be selected, although the scope of the inventive subject matter is not limited in this respect. Operation 610 demodulates the selected signal and may further process the selected signal in transceiver circuitry.

In some embodiments, operation 602 may comprise providing substantially a predetermined phase difference between a first antenna port and a first switch port of the hybrid. The signal path between reactive power-dividers associated with the ports may comprise 90-degree bends to reduce the physical distance between the reactive power-dividers to less than the physical distance associated with the predetermined phase difference. In some embodiments, the signals may comprise orthogonal frequency-division multiplexed signals comprising a plurality of symbol-modulated subcarriers in a predetermined frequency spectrum. The predetermined frequency spectrum may comprise either a 5 GHz frequency spectrum or a 2.4 GHz frequency spectrum. Operation 602 may also comprise generating a first sum signal and a first difference signal in a first frequency spectrum with a first compact hybrid from a pair of antennas, and generating a second sum signal and a second difference signal in a second frequency spectrum with a second compact hybrid from the pair of antennas. Operation 602 may also comprise separating the signals received through the pair of antennas into signals of the first and second frequency spectrums prior to generating the sum and difference signals. In these embodiments, operation 608 may comprise selecting between either the first sum signal and the first difference signal, or the second sum signal and the second difference signal. In some embodiments, operation 608 may comprise combining the first and second sum signals and the first and second difference signal prior to performing operation 610.

Although the individual operations of procedure 600 are illustrated and described as separate operations, one or more of the individual operations may be performed concurrently, and nothing requires that the operations be performed in the order illustrated.

Some embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. Circuitry comprising:
   a four-port hybrid to combine signals from a pair of antennas and to provide a sum signal and a difference signal; and
   switching circuitry to select between the sum signal and the difference signal based on a signal quality of the sum and difference signals,
   wherein the hybrid comprises a reactive power divider associated with each of the ports, and
   wherein signal paths between the reactive power dividers comprise a plurality of bends to reduce a distance between the reactive power-dividers to less than a physical distance associated with a predetermined phase difference between the ports.

2. The circuitry of claim 1 wherein the hybrid has a first antenna port to couple with a first of the antennas, a second antenna port to couple with a second of the antennas, and a first and a second switch port to provide respectively the sum signal and the difference signal,
   wherein the signal paths are compressed signal paths having a plurality of 90-degree bends therein to reduce spacing between the ports to less than the physical distance associated with the predetermined phase difference between the ports.

3. The circuitry of claim 1 wherein the hybrid comprises reactive-power dividers associated with a first antenna port and a first switch port,
   wherein the hybrid is to provide substantially a predetermined phase difference between the first antenna port and the first switch port, and
   wherein the reactive power-dividers associated with the first antenna port and the first switch port are spaced closer than a physical distance associated with the predetermined phase difference in a stripline medium.

4. The circuitry of claim 3 wherein the signal paths between the reactive power-dividers comprise the plurality of 90-degree bends to reduce a distance between the reactive power-dividers to less than a distance associated with the predetermined phase difference.

5. The circuitry of claim 2 wherein the hybrid is a 180-degree compact hybrid,
   wherein signal paths between ports of the hybrid comprise stripline,
   wherein the sum signal comprises signals from the antennas combined substantially in-phase, and
   wherein the difference signal comprises signals from the antennas combined substantially out-of-phase.

6. The circuitry of claim 1 wherein the switching circuitry further comprises logic circuitry to compare a packet error rate between the sum and difference signals and to select one of the signals which has a lower packet error rate.

7. The circuitry of claim 6 further comprising transceiver circuitry to measure the packet error rate of the sum and difference signals, and to receive the selected signal from the switching circuitry for subsequent demodulation.

8. The circuitry of claim 7 wherein the signals comprise orthogonal frequency-division multiplexed signals comprising a plurality of orthogonal symbol-modulated subcarriers in a 5 GHz frequency spectrum.

9. The circuitry of claim 7 wherein the signals comprise direct-sequence spread-spectrum modulated signals in a 2.4 GHz spectrum.

10. The circuitry of claim 7 wherein the signals comprise one of either orthogonal frequency-division multiplexed signals comprising a plurality of symbol-modulated subcarriers or complementary code keying-modulated signals, the signals being in a 2.4 GHz frequency spectrum.

11. Circuitry comprising:
    a hybrid to combine signals from a pair of antennas and to provide a sum signal and a difference signal; and
    switching circuitry to select between the sum signal and the difference signal based on a signal quality of the sum and difference signals,
    wherein the hybrid has a first antenna port to couple with a first of the antennas, a second antenna port to couple with a second of the antennas, and a first and a second switch port to provide respectively the sum signal and the difference signal,
    wherein a signal path between at least some of the ports is a compressed signal path having a plurality of 90-degree bends therein to reduce spacing between the at least some of the ports,
    wherein the hybrid is to provide substantially a ¾ wavelength phase difference between the first antenna port and the first switch port,
    wherein the hybrid is to provide substantially a ¼ wavelength phase difference between the first antenna port and the second switch port,
    wherein the hybrid is to provide substantially a ¼ wavelength phase difference between the second antenna port and the second switch port, and
    wherein the hybrid is to provide substantially a ¼ wavelength phase difference between the second antenna port and the first switch port.

12. Circuitry comprising:
    a hybrid to combine signals from a pair of antennas and to provide a sum signal and a difference signal; and
    switching circuitry to select between the sum signal and the difference signal based on a signal quality of the sum and difference signals,
    wherein the hybrid is a first hybrid to operate in a first frequency spectrum, and wherein the circuitry further comprises:
    a second hybrid to operate in a second frequency spectrum; and
    diplexing circuitry to provide signals received through the antennas in the first frequency spectrum to the first hybrid, and to provide signals received through the antennas in the second frequency spectrum to the second hybrid.

13. The circuitry of claim 12 wherein the diplexing circuitry is first diplexing circuitry, wherein the circuitry further comprises second diplexing circuitry, wherein the first hybrid is to provide a first sum signal and a first difference signal in the first frequency spectrum to the second diplexing circuitry, wherein the second hybrid is to provide a second sum signal and a second difference signal in the second frequency spectrum to the second diplexing circuitry, and
    wherein the second diplexing circuitry is to combine the first and second sum signals and the first and second difference signals to provide to the switching circuitry a combined sum signal and a combined difference signal, the combined sum and difference signals comprising frequencies in the first and second frequency spectrums.

14. The circuitry of claim 12 wherein the switching circuitry is first switching circuitry and wherein the circuitry further comprises second switching circuitry,
    wherein the first hybrid is to provide a first sum signal and a first difference signal in the first frequency spectrum to the first switching circuitry, and the second hybrid is to provide a second sum signal and a second difference signal in the second frequency spectrum to the second switching circuitry, and wherein the second switching circuitry is to select either the second sum signal or the second difference signal based on a signal quality of the second sum and difference signals.

15. The circuitry of claim 14 wherein the first switching circuitry is to provide either the sum or the difference signal in the first frequency spectrum to a first transceiver to process signals from the first frequency spectrum, and wherein the second switching circuitry is to provide either the sum or the difference signal in the second frequency spectrum to a second transceiver to process signals from the second frequency spectrum.

16. The circuitry of claim 12 wherein the signals comprise orthogonal frequency-division multiplexed signals comprising a plurality of symbol-modulated subcarriers, and wherein the first frequency spectrum is a 5 GHz frequency spectrum and the second frequency spectrum is a 2.4 GHz frequency spectrum.

17. A method comprising:

generating a sum signal and a difference signal with a hybrid from a pair of antennas; and selecting between the sum signal and the difference signal based on a packet error rate of the signals, wherein the hybrid comprises a reactive power divider associated with each of its ports, and wherein signal paths between the reactive power dividers comprise a plurality of bends to reduce a distance between the reactive power-dividers to less than a physical distance associated with a predetermined phase difference between the ports.

18. The method of claim 17 wherein the generating comprises providing substantially a predetermined phase difference between a first antenna port and a first switch port of the hybrid, wherein a signal path between reactive power-dividers associated with the ports comprises a plurality of 90-degree bends to reduce a distance between the reactive power-dividers to less than a distance associated with the predetermined phase difference.

19. The method of claim 18 further comprising:

measuring the packet error rate of the sum signal and the difference signal;

comparing the measured packet error rates; and demodulating the selected signal, wherein the signals comprise orthogonal frequency-division multiplexed signals comprising a plurality of symbol-modulated subcarriers in a predetermined frequency spectrum, the predetermined frequency spectrum comprising either a 5 GHz frequency spectrum or a 2.4 GHz frequency spectrum.

20. A method comprising:

generating a sum signal and a difference signal with a hybrid from a pair of antennas; and selecting between the sum signal and the difference signal based on a packet error rate of the signals, wherein the generating comprises providing substantially a predetermined phase difference between a first antenna port and a first switch port of the hybrid, wherein a signal path between reactive power-dividers associated with the ports comprises a plurality of 90-degree bends to reduce a distance between the reactive power-dividers to less than a distance associated with the predetermined phase difference, wherein the method further comprises:

measuring the packet error rate of the sum signal and the difference signal;

comparing the measured packet error rates; and demodulating the selected signal, wherein the signals comprise orthogonal frequency-division multiplexed signals comprising a plurality of symbol-modulated subcarriers in a predetermined frequency spectrum, the predetermined frequency spectrum comprising either a 5 GHz frequency spectrum or a 2.4 GHz frequency spectrum, wherein generating comprises:

generating a first sum signal and a first difference signal in a first frequency spectrum with a first hybrid from a pair of antennas;

generating a second sum signal and a second difference signal in a second frequency spectrum with a second hybrid from the pair of antennas; and separating the signals received through the pair of antennas into signals of the first and second frequency spectrums prior to generating the sum and difference signals, and wherein the selecting comprises selecting between either the first sum signal and the first difference signal, or the second sum signal and the second difference signal.

21. The method of claim 20 further comprising combining the first and second sum signals and the first and second difference signals prior to demodulating.

22. A hybrid comprising:

four reactive power-dividers, each associated with a port of the hybrid; and signal paths coupling the reactive power-dividers to provide a predetermined phase difference the ports, wherein the signal paths have a plurality of 90-degree bends therein to reduce a distance between the coupled reactive power-dividers to less than a physical distance associated with the predetermined phase difference.

23. The hybrid of claim 22 wherein the hybrid is a 180-degree hybrid fabricated in either a stripline or microstrip medium and is to combine signals from a pair of antennas to provide a sum signal and a difference signal, wherein the hybrid further comprises:

a first antenna port to couple with a first of the antennas;

a second antenna port to couple with a second of the antennas; and first and second switch ports to provide, respectively, the sum signal and the difference signal, the sum signal comprising signals from the antennas combined substantially in-phase, the difference signal comprising signals from the antennas combined substantially out-of-phase.

24. A hybrid comprising:

four reactive power-dividers; and signal paths coupling the reactive power-dividers to provide a predetermined phase difference therebetween, wherein the signal paths have a plurality of 90-degree bends therein to reduce a distance between the coupled reactive power-dividers to less than a distance associated with the predetermined phase difference, wherein the hybrid is a 180-degree hybrid fabricated in either a stripline or microstrip medium and is to combine signals from a pair of antennas to provide a sum signal and a difference signal, wherein the hybrid further comprises:

a first antenna port to couple with a first of the antennas;

a second antenna port to couple with a second of the antennas; and first and second switch ports to provide, respectively, the sum signal and the difference signal, the sum signal comprising signals from the antennas combined substantially in-phase, the difference signal comprising signals from the antennas combined substantially out-of-phase, wherein the signals comprise orthogonal frequency-division multiplexed signals comprising a plurality of symbol-modulated subcarriers in a predetermined frequency spectrum, the predetermined frequency spectrum comprising either a 5 GHz frequency spectrum or a 2.4 GHz frequency spectrum, wherein the hybrid is to provide substantially a ¾ wavelength phase difference between the first antenna port and the first switch port, wherein the hybrid is to provide substantially a ¼ wavelength phase difference between the first antenna port and the second switch port, wherein the hybrid is to provide substantially a ¼ wavelength phase difference between the second antenna port and the second switch port, and wherein the hybrid is to provide substantially a ¼ wavelength phase difference between the second antenna port and the first switch port.

\* \* \* \* \*

UNITED STATES PATENT AND TRADEMARK OFFICE
CERTIFICATE OF CORRECTION

| | |
|---|---|
| PATENT NO. | : 7,505,435 B2 |
| APPLICATION NO. | : 10/726053 |
| DATED | : March 17, 2009 |
| INVENTOR(S) | : Wittwer et al. |

Page 1 of 1

It is certified that error appears in the above-identified patent and that said Letters Patent is hereby corrected as shown below:

In column 12, line 7, in Claim 20, delete "freguency" and insert -- frequency --, therefor.

Signed and Sealed this

Twelfth Day of May, 2009

JOHN DOLL
*Acting Director of the United States Patent and Trademark Office*